United States Patent
Stone et al.

(10) Patent No.: US 9,619,533 B2
(45) Date of Patent: *Apr. 11, 2017

(54) SYSTEM AND METHOD FOR REPORTING MULTIPLE OBJECTS IN ENTERPRISE CONTENT MANAGEMENT

(71) Applicant: Veeva Systems Inc., Pleasanton, CA (US)

(72) Inventors: Jon Stone, Manteca, CA (US); Patrick Ota, San Jose, CA (US); Ian Wong, Pleasanton, CA (US); George Lee, Fremont, CA (US); Igor Tsives, San Carlos, CA (US); Eric Batzdorff, Alameda, CA (US)

(73) Assignee: VEEVA SYSTEMS INC., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,010

(22) Filed: Oct. 30, 2015

(65) Prior Publication Data
US 2016/0125049 A1 May 5, 2016

Related U.S. Application Data

(63) Continuation of application No. 14/530,694, filed on Nov. 1, 2014, now Pat. No. 9,208,200.

(51) Int. Cl.
*G06F 17/30* (2006.01)

(52) U.S. Cl.
CPC .. *G06F 17/30554* (2013.01); *G06F 17/30321* (2013.01); *G06F 17/30442* (2013.01); *G06F 17/30448* (2013.01); *G06F 17/30528* (2013.01); *G06F 17/30867* (2013.01)

(58) Field of Classification Search
USPC ................................ 707/713–715, 752, 754
See application file for complete search history.

(56) References Cited

U.S. PATENT DOCUMENTS

| | | | | |
|---|---|---|---|---|
| 7,213,013 | B1 * | 5/2007 | Subramania | G06F 17/30864 707/610 |
| 8,732,213 | B2 * | 5/2014 | Sowell | G06F 17/30911 707/809 |
| 2005/0273705 | A1 * | 12/2005 | McCain | G06F 17/24 715/234 |
| 2006/0031206 | A1 * | 2/2006 | Deubel | G06F 17/30722 |
| 2007/0106638 | A1 * | 5/2007 | Subramaniam | G06F 17/30392 |
| 2007/0208697 | A1 * | 9/2007 | Subramaniam | G06F 17/30545 |
| 2013/0166568 | A1 * | 6/2013 | Binkert | G06F 17/30911 707/741 |

(Continued)

*Primary Examiner* — Hanh Thai

(57) ABSTRACT

Systems and methods for multi-object reporting in a content management system. A report type definition may define which objects are involved and how they are related. A report execution engine may generate a multi-object query language statement to translate the report type definition into query language. A query language execution engine may break the query language statement down into separate single pieces. A cost optimization engine may determine if it is cost efficient to join the objects. An indexed access execution engine may extract unique IDs of the objects and join the unique IDs to generate an index. A Lucene based search engine may be accessed according to the index, and the response is post processed to generate a multi-object report.

20 Claims, 16 Drawing Sheets

(56) References Cited

U.S. PATENT DOCUMENTS

| | | | |
|---|---|---|---|
| 2014/0181141 A1* | 6/2014 | Sowell | G06F 17/30911 707/769 |
| 2014/0279834 A1* | 9/2014 | Tsirogiannis | G06F 17/30917 707/602 |
| 2014/0279838 A1* | 9/2014 | Tsirogiannis | G06F 17/30292 707/603 |
| 2015/0127656 A1* | 5/2015 | Faitelson | G06F 17/30312 707/741 |

* cited by examiner

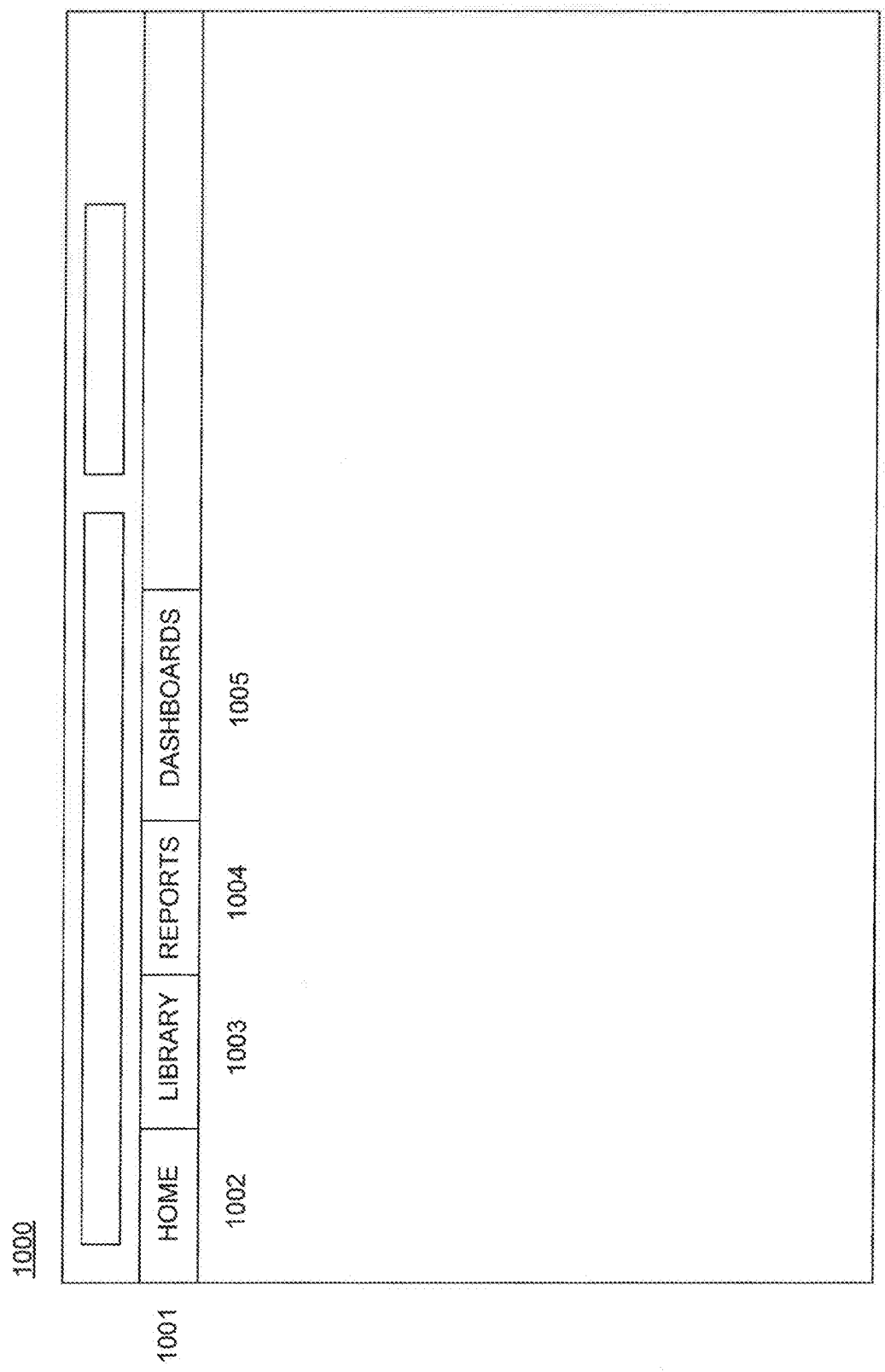

| Document ID | Primary | | | | Product | Country |
| --- | --- | --- | --- | --- | --- | --- |
| | Child Row Start for Product | Child Row End for Product | Child Row Start for Country | Child Row End for Country | | |
| 1 | 0 | 3 | 0 | 2 | | |
| 2 | 4 | 5 | 3 | 5 | | |

Product — Row ID: 0, 1, 2, 3, 4, 5

Country — Row ID: 0, 1, 2, 3, 4, 5

| HOME | LIBRARY | REPORTS | DASHBOARDS | | Search |
|---|---|---|---|---|---|

All Documents

| Name | Product |
|---|---|
| Test4 (v0.1) | CC |
| Number 10 (v0.1) | CC, VPXR |
| Test11 (v0.1) | |
| Test12 (v0.1) | |
| Test13 (v0.1) | |
| Test14 (v0.1) | |
| Test5 (v0.1) | VP |
| Test3 (v0.1) | |
| Test2 (v0.1) | CC |
| Test1 (v0.1) | CC |

SYSTEM AND METHOD FOR REPORTING MULTIPLE OBJECTS IN ENTERPRISE CONTENT MANAGEMENT

BACKGROUND

The subject technology relates generally to content management, and more particularly to object reporting in enterprise content management.

Users increasingly depend on content management systems because of their ubiquitous and managed access, from anywhere, at any time, from any device. However, some prior art content management systems do not have their own reporting tool, and their users need to use a third party reporting tool, which requires users to build a completely separate data store, take data from the content management system, and move and transform data into the third party reporting tool. While some prior art content management systems have their own reporting tool, it is strictly on documents or workflow and usually is a row of data per document, thus very inflexible. FIG. 1 illustrates an exemplary report page provided by such a prior art content management system reporting tool.

Thus, it is desirable to enable correlation of data in a content management system, so that customers can use complex objects to define or report real time data in flexible format.

SUMMARY

The disclosed subject matter relates to a method for reporting multiple objects in a content management system, the method comprising: storing a plurality of objects in a storage device; receiving a report type definition which defines a first object and a second object and a relationship between the first and second objects; generating a multi-object query language statement for the report type definition; dissecting the multi-object query language statement into a first query and a second query, wherein the first query corresponds to the first object, and the second query corresponds to the second object; generating an indexed access query definition for the first and second queries; and extracting ID of the first object corresponding to the first query in the indexed access query definition and ID of the second object corresponding to the second query in the indexed access query definition.

BRIEF DESCRIPTION OF THE DRAWINGS

FIG. 10 illustrates an exemplary graphical user interface (GUI) to start multi-object reporting according to one embodiment of the present invention.

FIG. 13 illustrates an exemplary GUI which displays documents in the content management system.

FIG. 14 illustrates an example of the resulting index file after a join.

DETAILED DESCRIPTION

Figure 1:
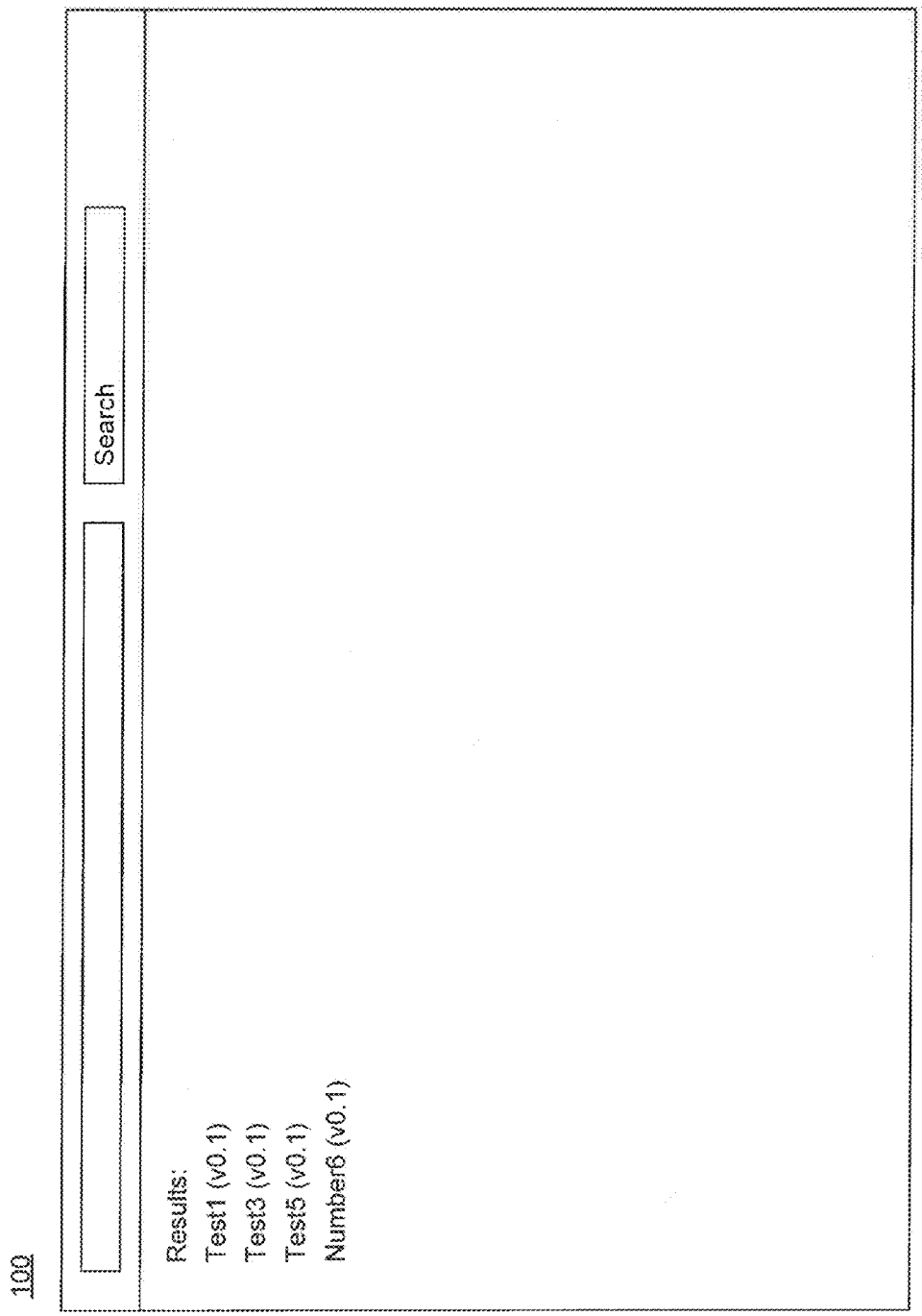
FIG. 1 illustrates an exemplary report page provided by a reporting tool in a prior art content management system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology is directed to techniques for reporting multiple objects in a content management system. An object could be a dynamically changeable item, e.g., a table. Objects may be stored in a flexible format, and indexed within a search engine. The search engine may be, e.g., a Lucene based search engine which is based on the idea of a document containing fields of text. This flexibility allows Lucene's API to be independent of the file format. Text from PDFs, HTML, Microsoft Word, and OpenDocument documents, as well as many others, can all be indexed as long as their textual information can be extracted. The objects may be defined by a content management system's service provider or customer according to the managed content or a portion thereof, e.g., a product, a document or a country.

In a content management system, a document may have a number of properties, e.g., product, country, file name, file size, file type, and if it is approved. One or more of these properties may further be associated with multiple properties, e.g., name, nickname, abbreviation, and type of a product. When a user creates a document in the content management system, he/she may be asked to provide these properties. With these properties, users may aggregate data to find out all documents with a certain property (e.g., product type), and be provided with aggregate functions like count (e.g., by product type or by country), average and sum. Users may also group the data, e.g., requesting a report which groups the data first by product type, and then by country. Thus, even though an object only has a pointer, it could be a very complex object. The content management system needs to be able to report on it and filter on it, e.g., by providing a report which only shows documents whose product type is cholesterol drug.

Instead of keeping a single big bulk object where everything is denormalized and users have to re-index search criteria whenever there is any change, the content management system of the present invention may keep objects structured and separate, segregate the data, and then perform join on demand in response to a query. Having the data separate in little pieces allows the content management system to be much more efficient, flexible and easier to maintain.

A search engine may take the objects stored within a storage device, and a join engine may join objects returned from the search engine and turn them into a composite object. That information may then be displayed in a format, which has a driver object, or main object, and each object's association to that driver object. When there are multiple objects, the relationship between one join and another join may be very different. For example, a document in the content management system may have 15 products, but only one country, a different object. Thus, these individual objects are distinctly different, but associated. A user may sort within each of those objects, without actually affecting the sort of the driver object.

In one implementation, a search engine, e.g., a Lucene based search engine, may be used as a fast data store for objects. When a user definition of a report requires a join, an indexed access method based database and a standard hash join may be used to write a join for the Lucene based search engine to take separate Lucene indexes and join them together to create joined objects. The indexed access method may be, e.g., indexed sequential access method ("ISAM") or virtual storage access method ("VSAM").

Figure 2:
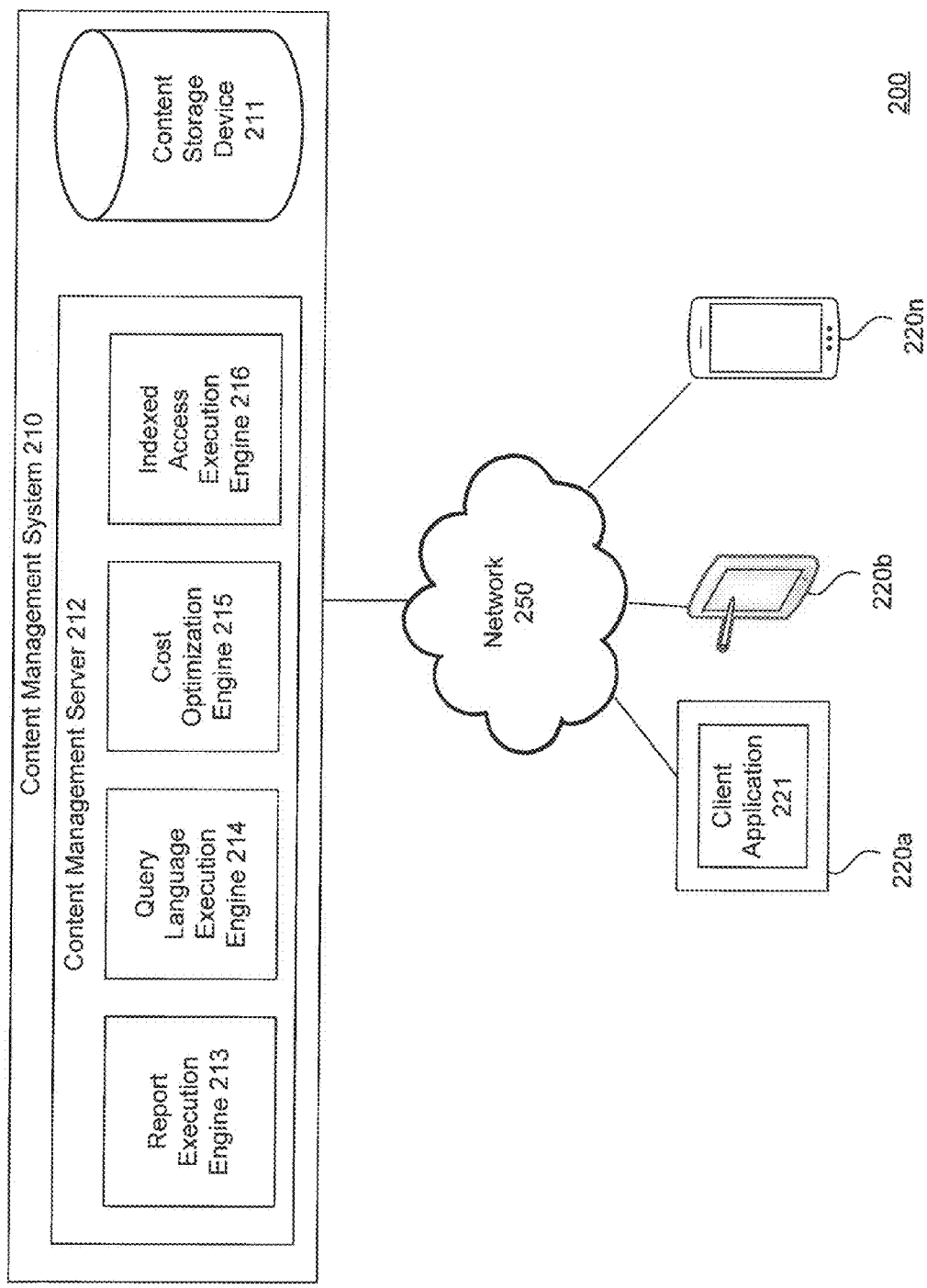
FIG. 2 illustrates an exemplary high level block diagram of an enterprise content management architecture wherein the present invention may be implemented.

FIG. 2 illustrates an exemplary high level block diagram of an enterprise content management architecture 200 wherein the present invention may be implemented. The enterprise may be a business, or an organization. As shown, the architecture 200 may include a content management system 210, and a plurality of user computing devices 220a, 220b, . . . 220n, coupled to each other via a network 250. The content management system 210 may include a content storage device 211 and a content management server 212. The network 250 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 220a-220n may be any machine or system that is used by a user to access the content management system 210 via the network 250, and may be any commercially available computing devices including laptop computers, desktop computers, mobile phones, smart phones, tablet computers, netbooks, and personal digital assistants (PDAs). A client application 221 may run from a user computing device, e.g., 220a, and access content in the content management system 210 via the network 250. User computing devices 220a-220n are illustrated in more detail in FIG. 4.

The content storage device 211 may store content that client applications (e.g., 221) in user computing devices 220a-220n may access and may be any commercially available storage devices. In one implementation, the content storage device 211 may store an electronic trial master file ("eTMF") which is a master file used to record the process that a drug will go through and giving sponsors and contract research organizations ("CROs") real-time access to clinical documentation at every point in a trial's set-up, execution and archival. On that document, there may be an object called "site", e.g., the locations the drug is tested. The document may also be associated a "study", and that study may have a number of different properties, e.g., the type of study.

In one implementation, the content storage device 211 may store customers' secure and proprietary content, such as product recipes, standard operating procedures ("SOPs"), change controls, and various FDA mandated electronic documents, to help pharmaceutical, biotechnology and medical products companies on improving quality control, security and compliance. Customers can create, review, approve, issue and make effective SOPs and related quality document types with core version control, document status and complete audit trails, speeding time to approval and ensuring tight regulatory compliance. Typical objects may include, e.g., workflow, distribution and facility.

In one implementation, the content storage device 211 may store medical communications, including standard response documents and medical letters, and FAQs. Typical objects may include, e.g., document, workflow, distribution, product and country.

In one implementation, the content storage device 211 may store promotional materials in the life sciences industry. Typical objects may include, e.g., document, workflow, distribution, product and country.

It should be understood that the content storage device 211 may store content for other industries.

The content management server 212 is typically a remote computer system accessible over a remote or local network, such as the network 250. The content management server 212 could be any commercially available computing devices. A client application (e.g., 221) process may be active on one or more user computing devices 220a-220n, and the corresponding server process may be active on the content management server 212. The client application process and the corresponding server process may communicate with each other over the network 250, thus providing distributed functionality and allowing multiple client applications to take advantage of the information-gathering capabilities of the content management system 210. In one implementation, the content management server 212 may include a report execution engine 213, a query language execution engine 214, a cost optimization engine 215, and an indexed access execution engine 216.

The report execution engine 213 may receive a user definition of the report, and then parse the report definition. The report execution engine 213 may determine if the requested report contains multiple objects, and generate a multi-object query language statement if it does. When the requested report contains only one object, the report execution engine 213 may generate a single object query language statement. The report execution engine 213 may then send the query language statements to the query language execution engine 214 for query execution. The report execution engine 213 may receive query execution results back from the query language execution engine 214, and post process the results to present a user friendly report.

The query language execution engine 214 may receive the multi-object query language statement from the report execution engine 213, parse and dissect the received multi-object query language statement into individual queries for each object involved. Since the Lucene based search engine itself is an indexing and search library and does not contain crawling and HTML parsing functionality, the parsing may be based on Another Tool for Language Recognition ("ANTLR") and carried out in JAVA objects in one implementation. The query language execution engine 214 may determine if the multi-object query language statement is valid, and create an execution plan if it is. The query language execution engine 214 may generate a query definition based on individual statements defining relationships between objects. In one implementation, the query definition may be a VSAM query definition. The query language execution engine 214 may then receive a resulting index from the indexed access execution engine 216, execute query and return results to the report execution engine 213 for post processing. The query language execution engine 214 may also receive the single object query language statement from the report execution engine 213, execute query and return results to the report execution engine 213 for post processing. In one implementation, the query execution is carried out on a Solr search platform.

The cost optimization engine 215 may optimize the queries with cost based optimization. The cost optimization engine 215 may receive the query definition from the query language execution engine 214, and calculate cost of each object involved in the query. The cost optimization engine 215 may determine if extra filtering is necessary. If extra filtering is necessary, the cost optimization engine 215 may execute base object and optimize the query against the child object.

At the indexed access execution engine 216, unique IDs for each of the objects in the query definition may be extracted from Lucene/Solr, and data may be persisted to MySQL in memory table for each object. Join may be executed between objects based on foreign key relationships to filter down expected result set. The join results may be exported to a fixed binary representation in the file system, which is an index. The index may be returned to the query language execution engine 214 where size based index access can be performed. In one implementation, hash function may be used to join in the database, and combined with Lucene based search engine to keep flexible data schema.

Although the report execution engine 213, the query language execution engine 214, the cost optimization engine 215 and the indexed access execution engine 216 are shown in one server, it should be understood that they may be implemented in multiple servers.

In one implementation, the content management system 210 may be a multi-tenant system where various elements of hardware and software may be shared by one or more customers. For instance, a server may simultaneously process requests from a plurality of customers, and the content storage device 211 may store content for a plurality of customers. In a multi-tenant system, a user is typically associated with a particular customer. In one example, a user could be an employee of one of a number of pharmaceutical companies which are tenants, or customers, of the content management system 210.

In one embodiment, the content management system 210 may run on a cloud computing platform. Users can access content on the cloud independently by using a virtual machine image, or purchasing access to a service maintained by a cloud database provider.

In one embodiment, the content management system 210 may be provided as Software as a Service ("SaaS") to allow users to access the content management system 210 with a thin client.

Figure 3:
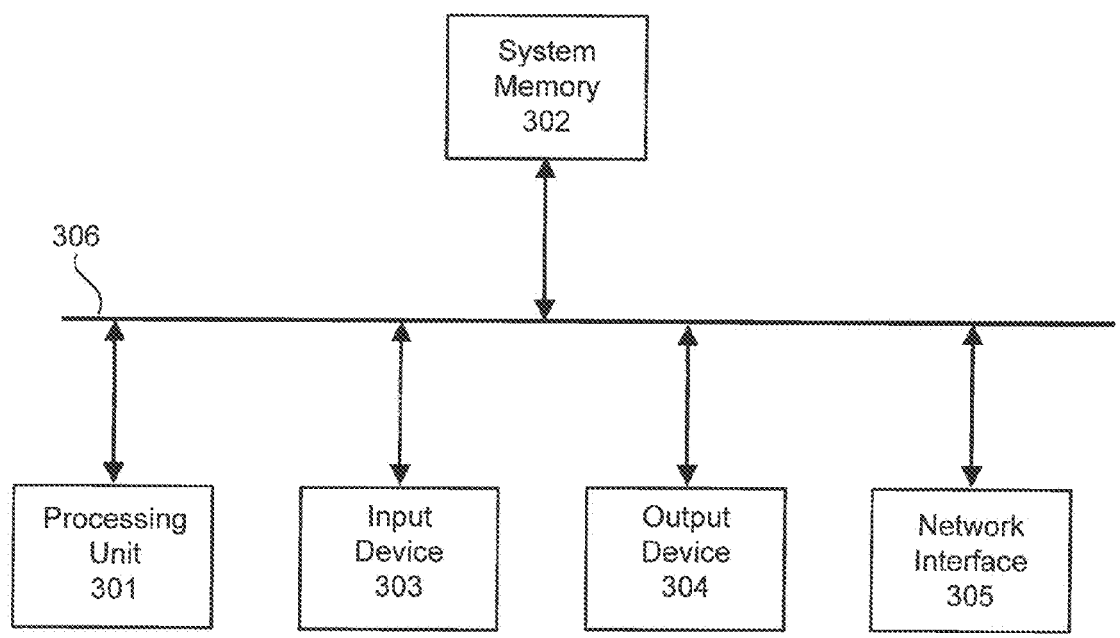
FIG. 3 illustrates an exemplary block diagram of a computing device.

FIG. 3 illustrates an exemplary block diagram of a computing device 300 which can be used as the user computing devices 220a-220n, the report execution engine 213, the query language execution engine 214, the cost optimization engine 215 and/or the indexed access execution engine 216 in FIG. 2. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. The processing unit 301 may be a central processing unit (CPU).

The system memory 302 typically includes a variety of computer readable media which may be any available media accessible by the processing unit 301. For instance, the system memory 302 may include computer storage media in the form of volatile and/or nonvolatile memory such as read only memory (ROM) and/or random access memory (RAM). By way of example, but not limitation, the system memory 302 may store instructions and data, e.g., an operating system, program modules, various application programs, and program data.

A user can enter commands and information to the computing device 300 through the input device 303. The input device 303 may be, e.g., a keyboard, a touchscreen input device, a touch pad, a mouse, a microphone, and/or a pen.

The computing device 300 may provide its output via the output device 304 which may be, e.g., a monitor or other type of display device, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 250) and/or buses. The network interface 305 may be configured to allow the computing device 300 to transmit and receive data in a network, for example, the network 250. The network interface 305 may include one or more network interface cards (NICs).

Figure 4:
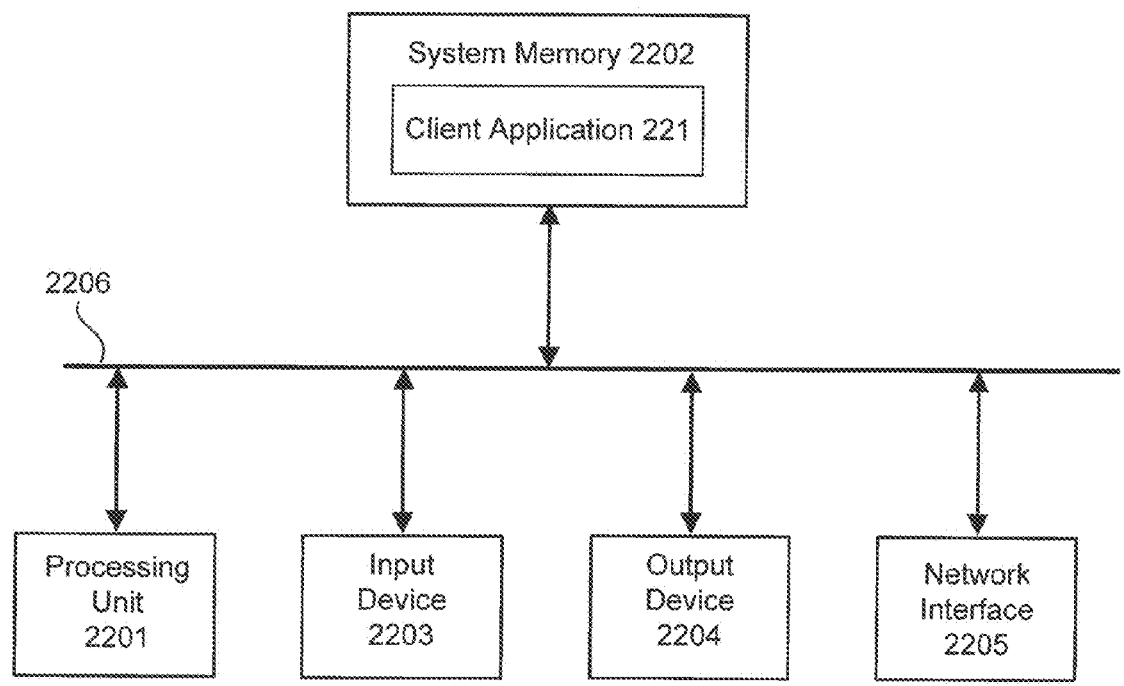
FIG. 4 illustrates an exemplary high level block diagram of a user computing device.

FIG. 4 illustrates an exemplary high level block diagram of a user computing device (e.g., 220a) wherein the present invention may be implemented. The user computing device 220a may be implemented by the computing device 300 described above, and may have a processing unit 2201, a system memory 2202, an input device 2203, an output device 2204, and a network interface 2205, coupled to each other via a system bus 2206. The system memory 2202 may store the client application 221.

Figure 5:
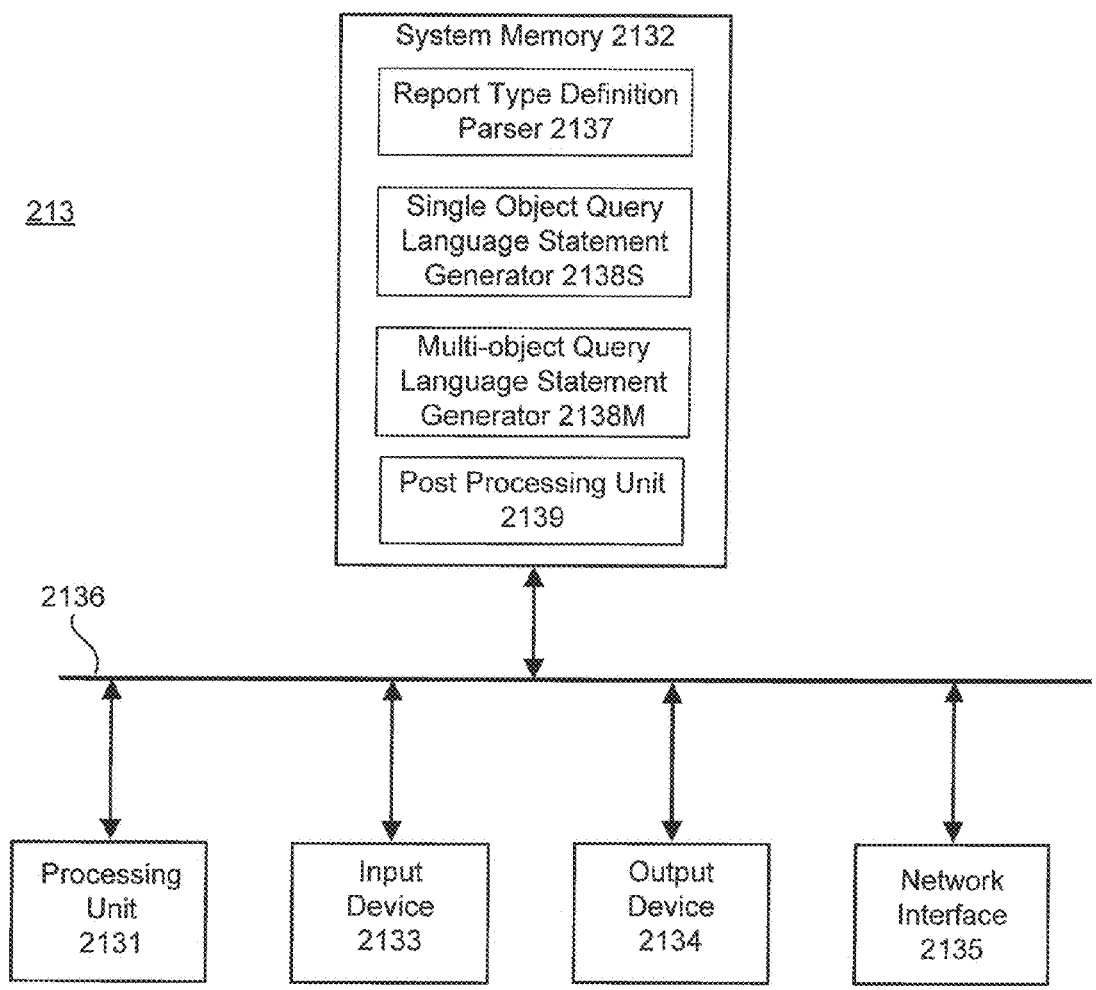
FIG. 5 illustrates an exemplary high level block diagram of a report execution engine in the enterprise content management architecture shown in FIG. 2 according to one embodiment of the present invention.

FIG. 5 illustrates an exemplary high level block diagram of the report execution engine 213 according to one embodiment of the present invention. The report execution engine 213 may be implemented by the computing device 300, and may have a processing unit 2131, a system memory 2132, an input device 2133, an output device 2134, and a network interface 2135, coupled to each other via a system bus 2136. The system memory 2132 may store a report type definition parser 2137 for parsing report type definitions, a single object query language statement generator 2138S for generating single object query language statements, a multi-object query language statement generator 2138M for generating multi-object query language statements, and a post processing unit 2139 for processing response from the query language execution engine 214 to generate reports to be displayed to the user.

Figure 6:
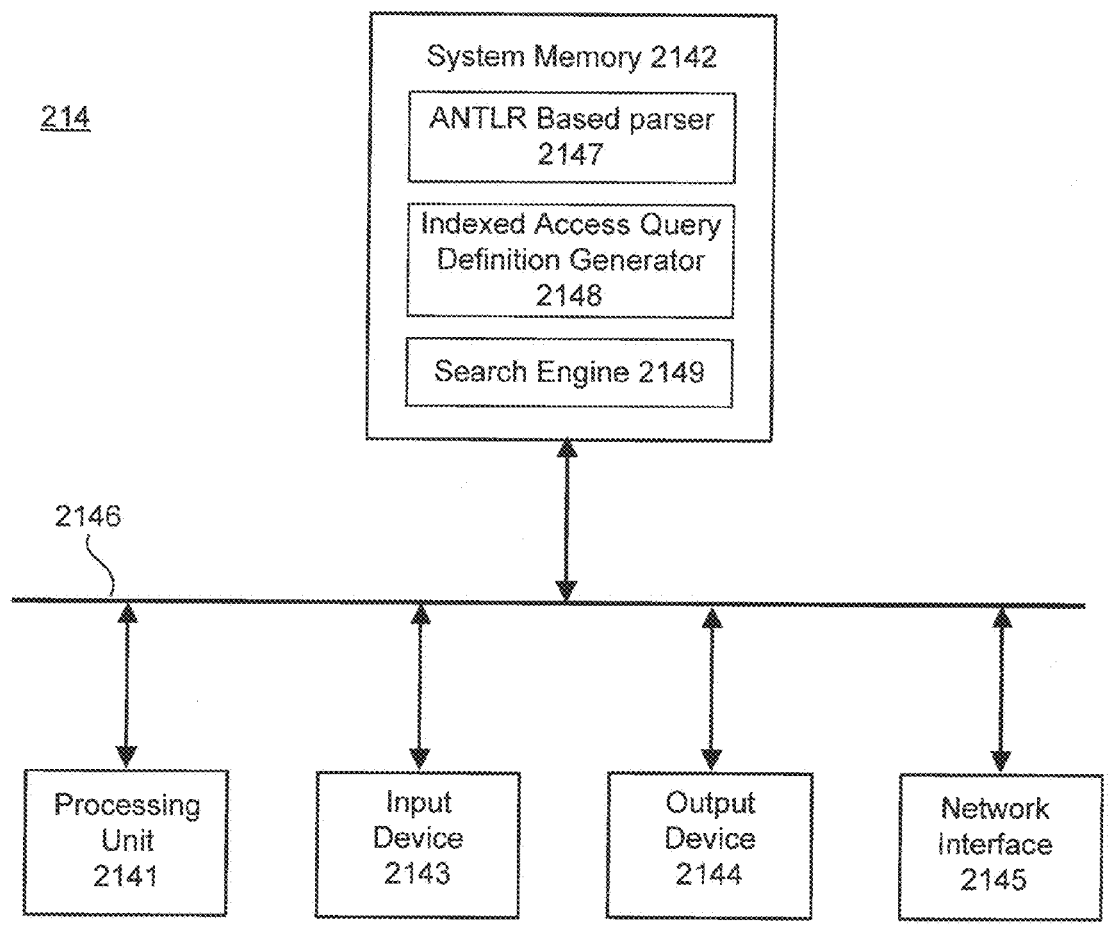
FIG. 6 illustrates an exemplary high level block diagram of a query language execution engine in the enterprise content management architecture shown in FIG. 2 according to one embodiment of the present invention.

FIG. 6 illustrates an exemplary high level block diagram of the query language execution engine 214 according to one embodiment of the present invention. The query language execution engine 214 may be implemented by the computing device 300, and may have a processing unit 2141, a system memory 2142, an input device 2143, an output device 2144, and a network interface 2145, coupled to each other via a system bus 2146. The system memory 2142 may store an ANTLR based parser 2147 for parsing multi-object query language statements from the report execution engine 213, an indexed access query definition generator 2148 for generating indexed access query definition, and a search engine 2149 for receiving the single object query language statements from the report execution engine 213 and/or the index generated by the indexed access query execution engine 216 for multi-object query language statements, and performing index access.

Figure 7:
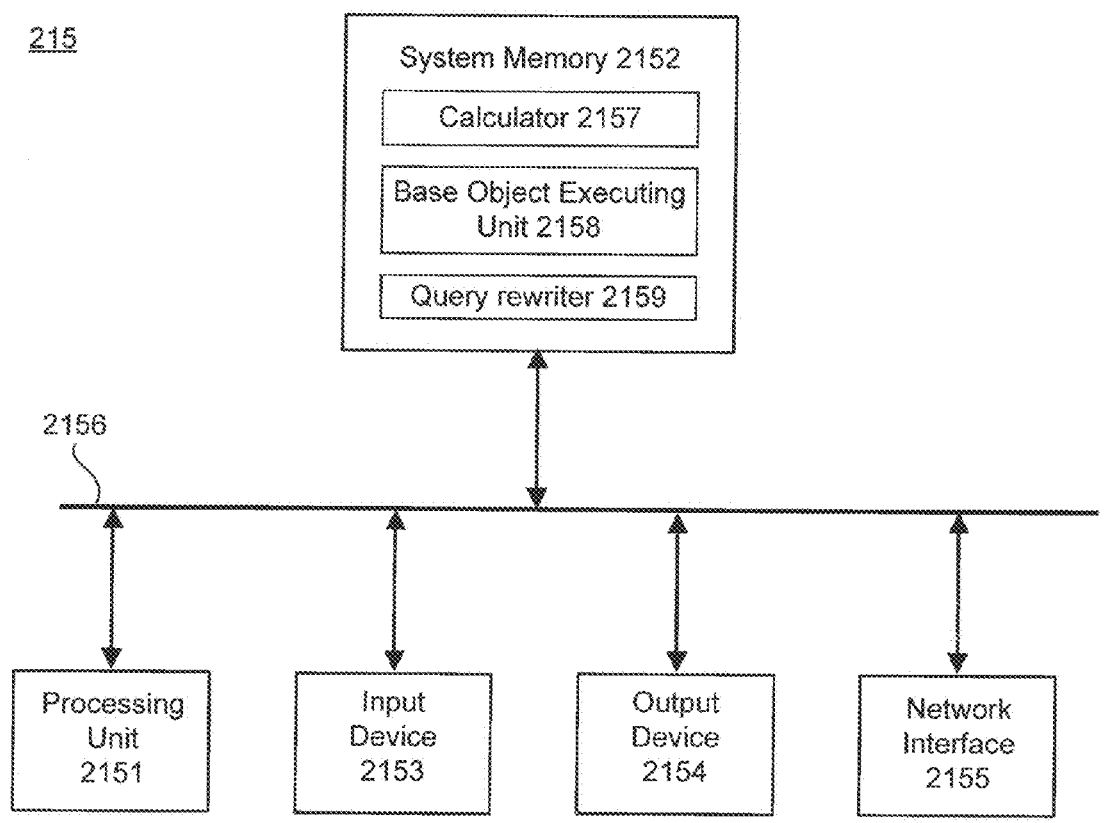
FIG. 7 illustrates an exemplary high level block diagram of a cost optimization engine in the enterprise content management architecture shown in FIG. 2 according to one embodiment of the present invention.

FIG. 7 illustrates an exemplary high level block diagram of the cost optimization engine 215 according to one embodiment of the present invention. The cost optimization engine 215 may be implemented by the computing device 300, and may have a processing unit 2151, a system memory 2152, an input device 2153, an output device 2154, and a network interface 2155, coupled to each other via a system bus 2156. The system memory 2152 may store a calculator 2157 for calculating the cost of each object involved in the indexed access query definition from the query language execution engine 214, a base object executing unit 2158 for executing the base object, and a query rewriter 2159 for rewriting queries to optimize querying child objects.

Figure 8:
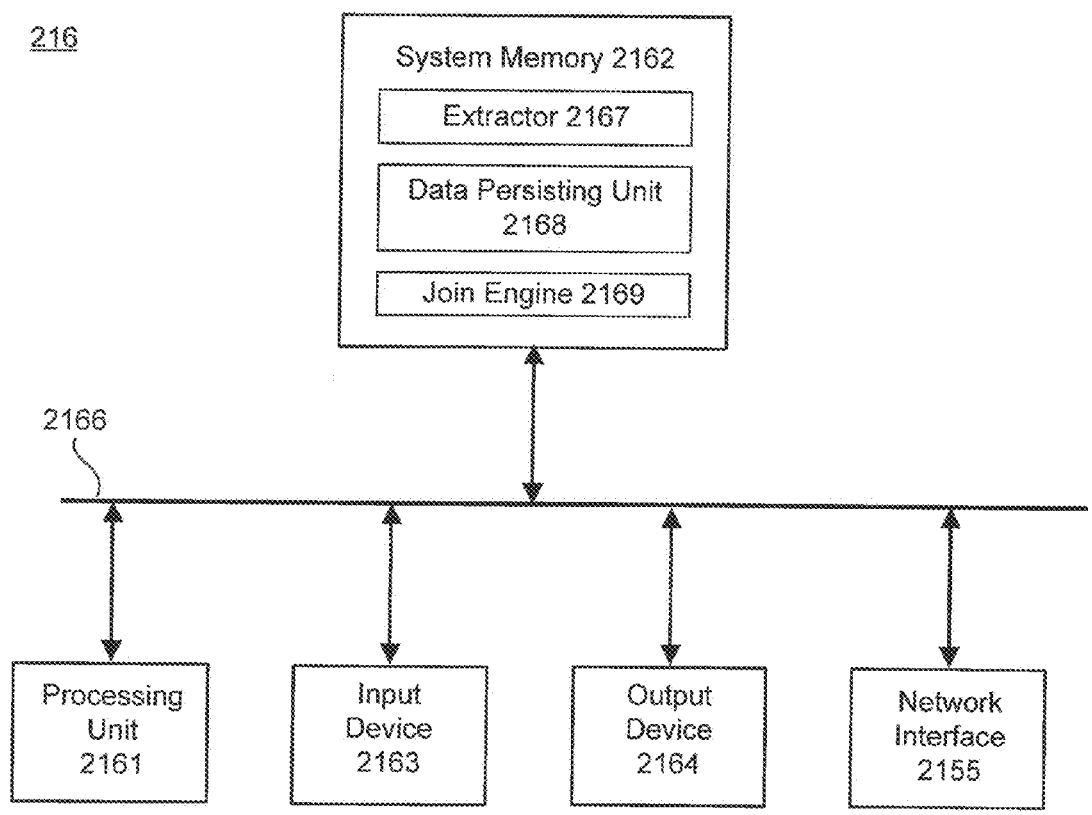
FIG. 8 illustrates an exemplary high level block diagram of an indexed access execution engine in the enterprise content management architecture shown in FIG. 2 according to one embodiment of the present invention.

FIG. 8 illustrates an exemplary high level block diagram of the indexed access execution engine 216 according to one embodiment of the present invention. The indexed access execution engine 216 may be implemented by the computing device 300, and may have a processing unit 2161, a system memory 2162, an input device 2163, an output device 2164, and a network interface 2165, coupled to each other via a system bus 2166. The system memory 2162 may store an extractor 2167 for extracting unique IDs for each object in indexed access query definitions from the Solr search engine 2149, a data persisting unit 2168 for persisting data to MySQL, and a join engine 2169 for executing join between objects.

Figure 9A:
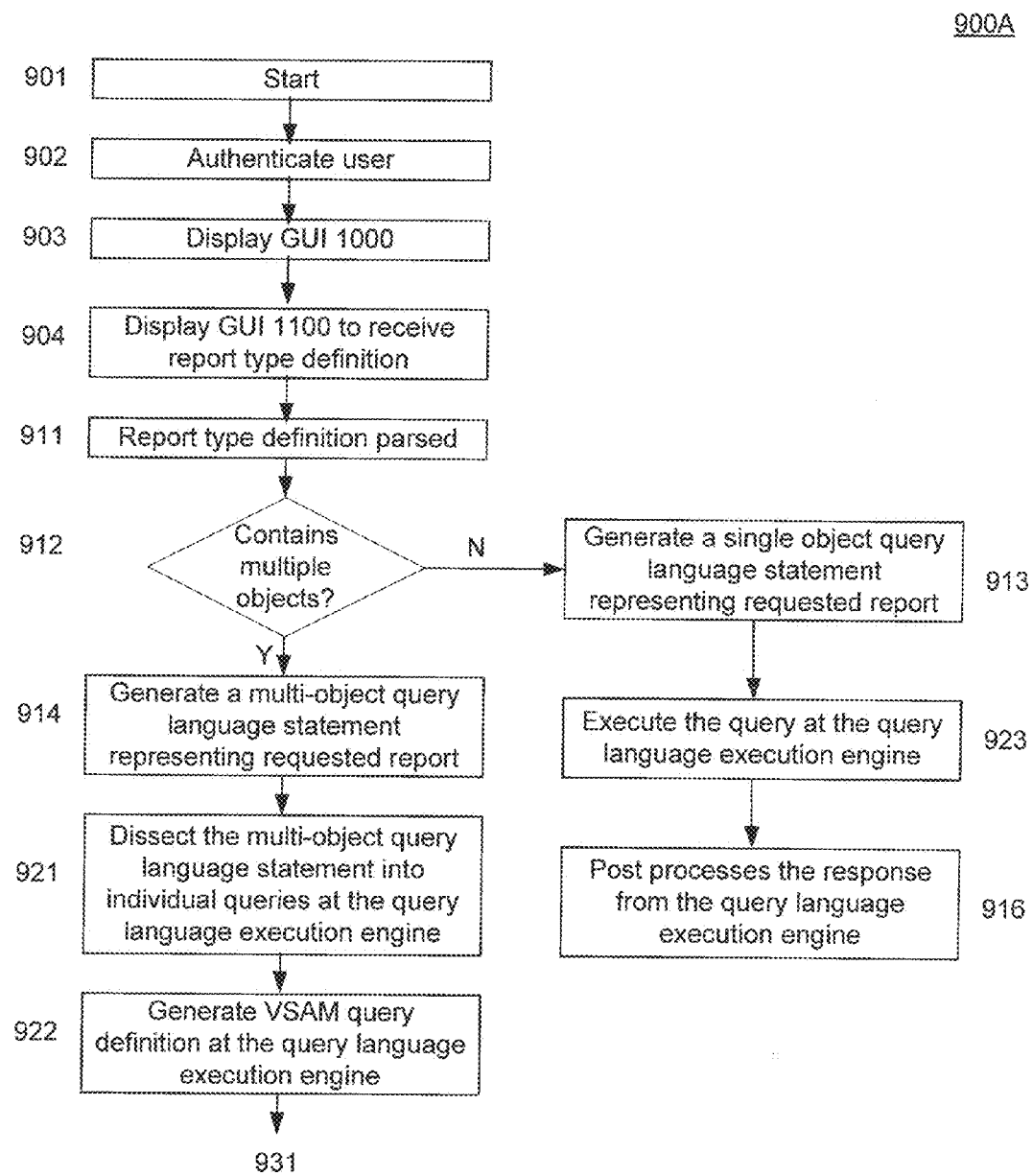
FIGS. 9A and 9B illustrate an exemplary flowchart of a method for reporting multiple objects in the enterprise content management architecture shown in FIG. 2 according to one embodiment of the present invention.
Figure 9B:
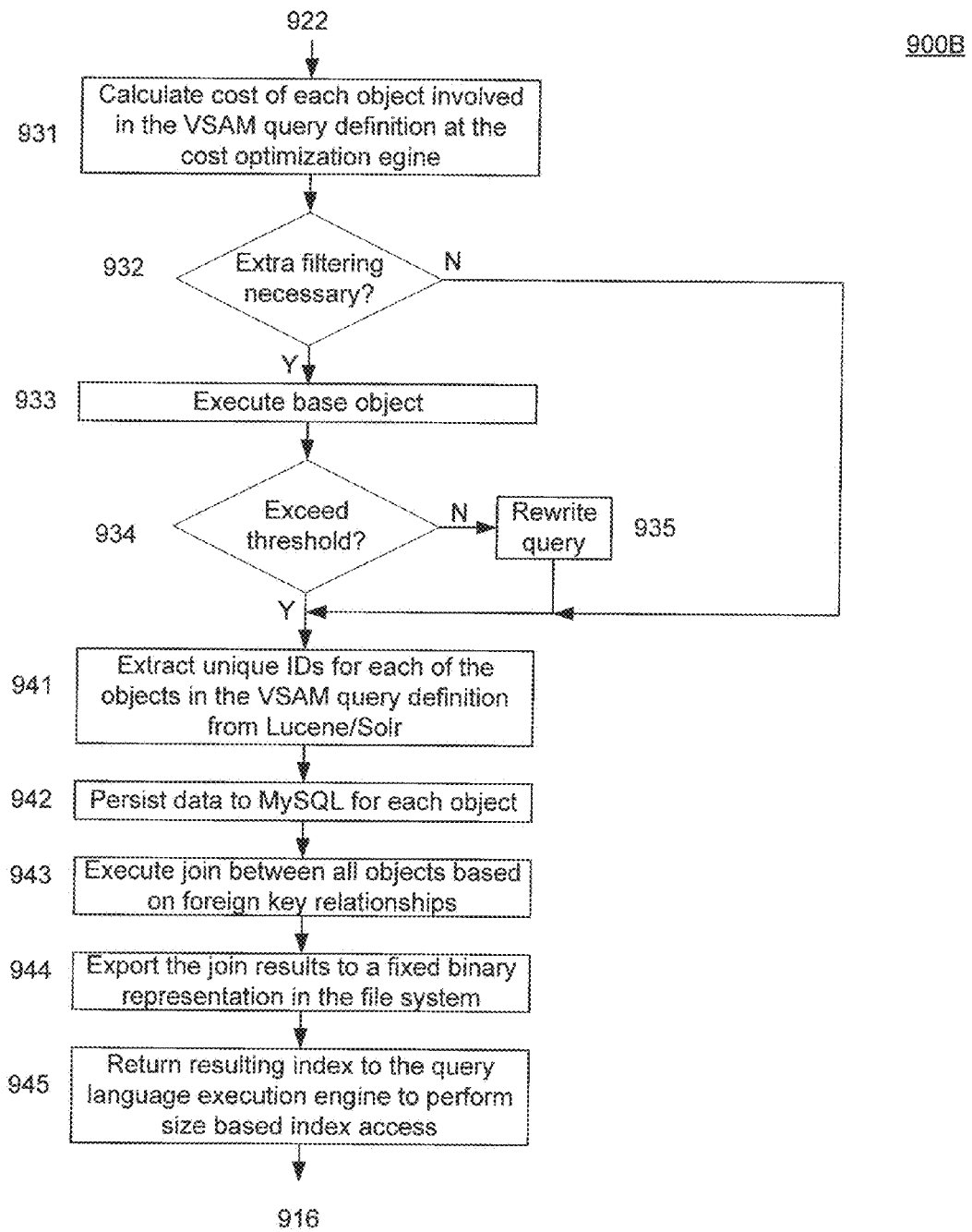

FIGS. 9A-9B illustrate an exemplary flowchart of a method for reporting multiple objects in the enterprise content management system 200 (as shown in FIG. 2) according to one embodiment of the present invention. A user executing the request may input a report type definition which defines which objects are involved and how they are related. The report execution engine 213 may generate a query language statement to translate the report type definition into query language. The query language execution engine 214 may break the query language statement down into separate single pieces, the cost optimization engine 215 may determine if it is cost efficient to join the objects, and the indexed access execution engine 216 may join the objects, which are not physically connected, by creating links based on the report type definition. Index access and reporting may then be executed.

The process may start at 901.

At 902, a user may log into the client application 221, and be authenticated to access the content management system 210.

At 903, a GUI 1000, as shown in FIG. 10, may be displayed. The GUI 1000 may have a menu bar 1001 for receiving user commands for interacting with the content management system 200. In one implementation, the menu bar 1001 may include a number of buttons or clickable areas, e.g., 1002 for HOME, 1003 for LIBRARY, 1004 for REPORTS, and 1005 for DASHBOARDS. If the user wants to run a report, he/she may click on the REPORTS button 1004.

Figure 11:
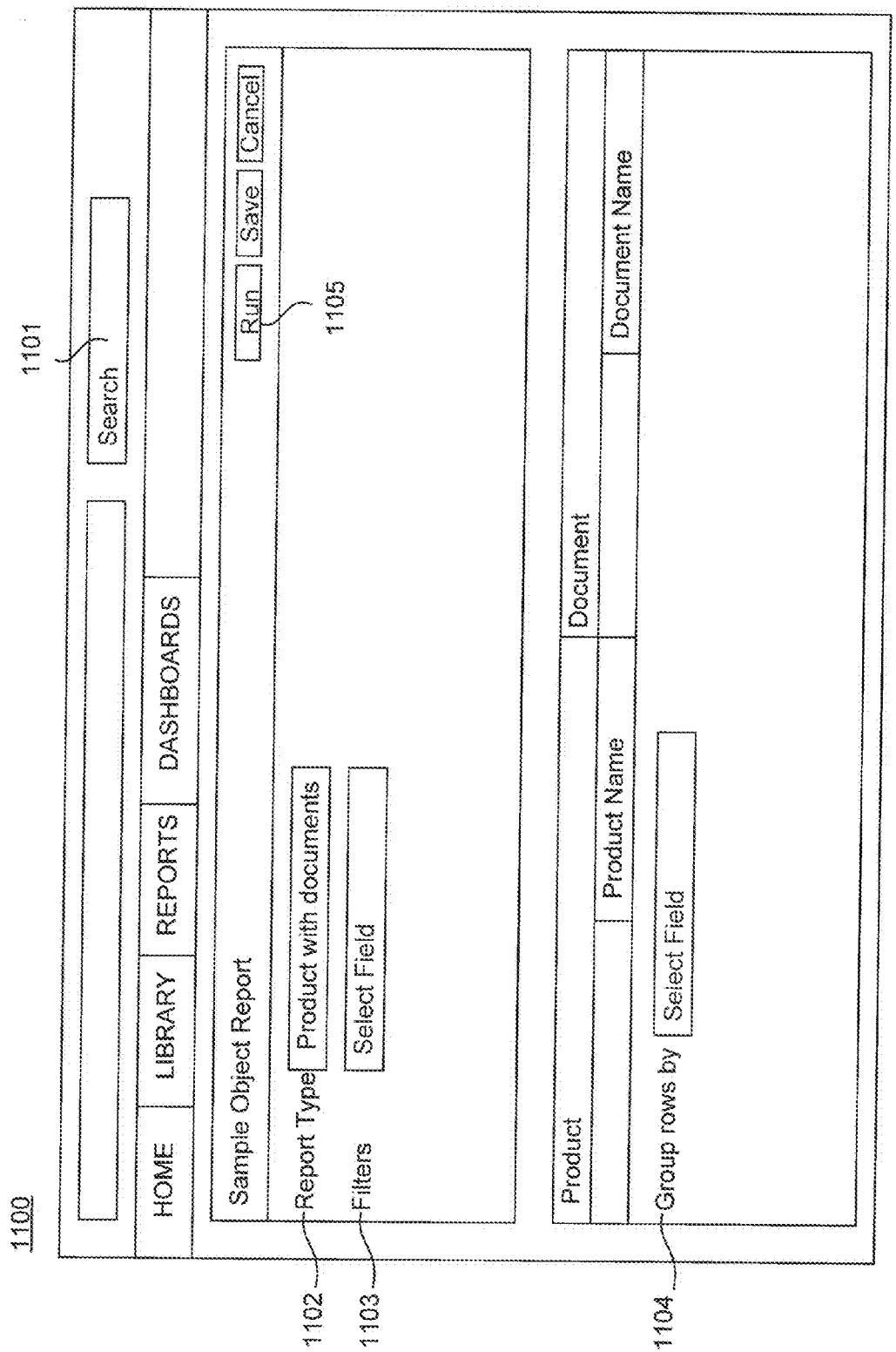
FIG. 11 illustrates an exemplary GUI to receive user definition of a report according to one embodiment of the present invention.

In response, at 904, a GUI 1100, as shown in FIG. 11, may be displayed to receive user definition of the report. In one implementation, the GUI 1100 may have various windows for receiving user input including a Search window 1101, a Report Type window 1102, a Filters window 1103, and a Group window 1104. The Search window 1101 may receive search terms from the user. The Report Type window 1102 may receive user input for report type, e.g., "product with document", or "document with product and country". The filter window 1103 may allow the user to select one or more filters in the report definition, e.g., using a product name "VPXR" as a filter to narrow down objects to be displayed to only those related to VPXR. The Group window 1104 may allow the user to select how to group rows in the report, e.g., by Product or by Document. More properties of a document may be added to group the rows by, e.g., a generic name, and an abbreviation. When a user has selected the report type and the filter and clicked the "Run" button 1105, the reporting process may start.

At 911, the report type definition received on the GUI 1100 may be parsed at the report execution engine 213, specifically, the report type definition parser 2137. For the report type definition "product with document" received on the GUI 1100 shown in FIG. 11, the parsed report type definition in database may be:

```
primary object is product
public_key is product_with_document_c
report type definition is,
<downRelationships>
<downRelationship key="Product.document"
keyRef="reportTypeRef1403542951011" joinType="inner" />
</downRelationships>
</reportType>
```

At 912, it may be determined if the requested report contains multiple objects.

When the requested report contains only one object, e.g., product or country, a single object query language statement representing the requested report may be generated by the report execution engine at 913, more specifically, the single object query language statement generator 2138S. The process may then proceed to 923 to execute the query at the query language execution engine 214.

If the requested report contains multiple objects, at 914, a multi-object query language statement may be generated at the report execution engine 213, more specifically, the multi-object query language statement generator 2138M.

In one implementation, product_v and country_v are the ObjectReference document fields of object type product_v and country_v respectively. To select the object record data of the objects referenced by these document fields, the following multi-object query language statement may be generated at 914:

```
SELECT id,
    (SELECT external_id_v FROM document_product_vr),
    (SELECT name_v FROM document_country_vr)
FROM documents
WHERE name_v = 'Test'                    Example (1)
```

In Example (1) of the multi-object query language statement, object fields are accessed through a relationship path notation defined at the field. Document_product_vr and document_country_vr relationships are JOIN relationships between document and product, and document and country respectively.

Another example of the multi-object query language statement generated at 914 may be:

```
SELECT id,
    (SELECT external_id_v FROM document_product_vr
    WHERE name_v = 'CLCP01' LIMIT 100),
    (SELECT name_v FROM document_country_vr)
FROM documents FIND "search term"
WHERE name_v = 'Test'                    Example (2)
```

A further example of the multi-object query language statement generated at 914 may be:

```
SELECT id, name_v,
    (SELECT id, name_v, major_version_number_v,
        minor_version_number_v
    FROM document_product_vr)
FROM product_v
WHERE id IN (SELECT product_v FROM document_product_vr)
                                         Example (3)
```

Example (3) of the multi-object query language statement corresponds to the "product with document" query received on the GUI 1100 shown in FIG. 11. The query is to return products that are used in documents, and the main object is the product.

The query language statements generated at 913 and 914 may be sent to the query language execution engine 214. For a single object query language statement, at 923, the query language execution engine 214 may execute a query, e.g., Solr query, and return response to the report execution engine 213. The process may proceed to 916 for post processing.

For a multi-object query language statement generated at 914, the statement may be parsed and dissected into individual queries for each object involved at the query language execution engine 214 at 921. In one implementation, the individual queries may be generated by an ANTLR based parsing and carried out in JAVA objects. The ANTLR based parser 2147 may parse the multi-object query language statement, determine if it is valid, and create a query plan if it is valid. For instance, in Example (3) of the multi-object query language statement shown above, there may be two individual queries: selecting from products, and selecting from documents. An example of the query plan may be:

```
Main Query: PRIMARY|358fac27-2248-4bb3-9df0-
635a4b6b1d1d|SELECT id FROM product_v LIMIT 1000 OFFSET 0
```

-continued

```
Sub Query: CHILD|488e0503-f579-45d3-8009-5adc5a1a345e|
SELECT product_v, id FROM documents LIMIT 250 OFFSET 0
    Join: 35fac27-2248-4bb3-9df0-635a4b6b1d1d|488e0503-f579-
    45d3-8009-5adc5a1a345e|id|product_v|leftOuterJoin
Sub Query: CHILD|21e79b35-542b-420e-a012-d0b042d3334a|
SELECT product_v, id FROM documents LIMIT 250 OFFSET 0
    Join: 358fac27-2248-4bb3-9df0-635a4b6b1d1d|21e79b35-542b-
    420e-a012-d0b0420334a|id|product_v|innerJoin
```

At 922, an indexed access query definition may be generated based on individual statements defining relationships between objects at the query language execution engine 214, more specifically the indexed access query definition generator 2148. In one implementation, the indexed access query definition may be a VSAM query definition. For Example (2) of the multi-object query language statement shown above, the indexed access query definition may be: there are three different objects (i.e., document, product and country), there is a child, and the documents need to be selected from a primary of product, and a child of country.

At 931, the cost optimization engine 215 may receive the indexed access query definition from the query language execution engine 214, and cost of each object involved in the indexed access query definition may be calculated. An example of the cost calculation for Example (3) of the multi-object query language statement is as follows:

```
Driver, ID=35fac27-2248-4bb3-9df0-635a4b6b1d1d
    Cost=4
    Solr=SELECT id FROM product_v ORDER BY id asc
LIMIT
    1000 OFFSET 0
Joins:
    (0) ID=21e79b35-542b-420e-a012-d0b042d3334a
        Type=innerJoin (parent_0), CHILD Cost=10
        Solr=SELECT product_v, id FROM documents LIMIT 250
        OFFSET 0
    (1) ID=488e0503-f579-45d3-8009-5adc5a1a345e
        Type=leftOuterJoin, CHILD Cost=10
        Solr=SELECT product_v, id FROM documents ORDER BY
        product_v asc LIMIT 250 OFFSET 0
```

At 932, it may be determined at the cost optimization engine 215 if extra filtering is necessary. If not, like Example (1) of the multi-object query language statement, the process may proceed to 941 to perform indexed access execution, e.g., VSAM execution.

If extra filtering is necessary, the cost optimization engine 215 may execute base object at 933 and then optimize the query against the child object. For instance, extra filtering is necessary for Example (2) of the multi-object query language statement, since it includes a WHERE clause "WHERE name_v='Test'" which requires the base object to filter child object. Similarly, for Example (3) of the multi-object query language statement, the WHERE clause requires filtering the base object "product" by the child object "document", so as to select products that are used in the documents.

The optimization may depend on the data. In one implementation, it may be determined if the amount of data exceeds a threshold at 934. If not, the cost optimization engine 215 may rewrite the query to be more efficient at 935, as will be discussed below with reference to FIG. 12, and the process may proceed to 941 to perform indexed access execution, e.g., VSAM execution. For instance, since Example (2) of the multi-object query language statement is most likely a highly filtering option, the query may be rewritten at 935. On the other hand, if there are a large number of pieces of data, e.g., when each piece of data needs to be joined against all other pieces of data and rewriting the query will not make the process more efficient, the process may skip the rewriting and directly proceed to 941 to perform the join. The cost optimization engine 215 may consider a number of different cost impacts, including the size of the object, and estimated size of the result.

Figure 12:
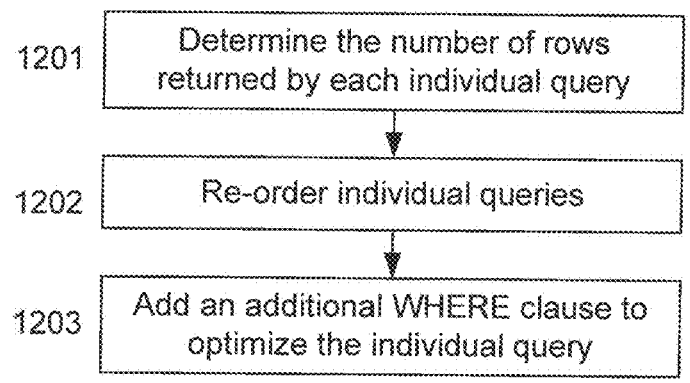
FIG. 12 illustrates an exemplary flowchart of a method for cost optimization according to one embodiment of the present invention.

FIG. 12 illustrates an exemplary flowchart of a method for cost optimization according to one embodiment of the present invention. As shown, at 1201, the number of rows returned by each individual query may be determined. In one embodiment, inner joins may be checked before outer joins. If any of the inner join individual queries return zero rows, an empty result set may be returned. At 1202, the individual queries may be re-ordered, e.g., by the number of rows for each from the lowest to the highest. At 1203, the individual queries may be optimized by adding additional WHERE clauses derived from the base or driver query.

diate results from the document query so that there are less data to process in subsequent steps:

"WHERE product_v='CC'"

Now return to FIG. 9. At 941, indexed access execution may start at the indexed access execution engine 216, and unique IDs for each of the objects in the indexed access query definition may be extracted from Lucene/Solr. In one implementation, a unique ID for a document may be "ID", and a unique ID for a product may be "document ID, ID". In one implementation, for Example (2) of the multi-object query language statement, ID, the product that associated with the ID, and the country associated with the ID may be selected. The product and the country may come from a document. Then from product and country, their IDs may be selected.

At 942, each of the IDs may be persisted into MySQL into separate memory tables. When the size of the output set exceeds a threshold, it may be stored on disks instead of memory tables. An example of the persisting is as follows:

```
Execute Primary Table SQL : CREATE TEMPORARY TABLE
d358fac2722484bb39df0635a4b6b1d1d (row_num BIGINT UNSIGNED NOT NULL
AUTO_INCREMENT, id CHAR(20), PRIMARY KEY(row_num))
INSERT INTO PRIMARY : INSERT INTO d358fac2722484bb39df0635a4b6b1d1d(id)
VALUES (?)
Execute JOIN Table SQL : CREATE TEMPORARY TABLE
c488e0503f57945d380095adc5a1a345e (row_num BIGINT UNSIGNED NOT NULL
AUTO_INCREMENT, fk CHAR(20), id CHAR(20), PRIMARY KEY(row_num))
INSERT INTO JOIN TABLE : INSERT INTO
c488e0503f57945d380095adc5a1a345e(fk,id) VALUES (?,?)
Execute JOIN Table SQL : CREATE TEMPORARY TABLE
c21e79b35542b420ea012d0b042d3334a (row_num BIGINT UNSIGNED NOT NULL
AUTO_INCREMENT, fk CHAR(20), id CHAR(20), PRIMARY KEY(row_num))
INSERT INTO JOIN TABLE : INSERT INTO
c21e79b35542b420ea012d0b042d3334a(fk,id) VALUES (?,?)
Execute Primary Table SQL : CREATE TEMPORARY TABLE
j8fb43757c91f41038b4bac735cabc4f4 (row_num BIGINT UNSIGNED NOT NULL
AUTO_INCREMENT, id CHAR(20), PRIMARY KEY(row_num))
PERFORM JOIN : INSERT INTO j8fb43757c91f41038b4bac735cabc4f4(id)
SELECT d358fac2722484bb39df0635a4b6b1d1d.id FROM
d358fac2722484bb39df0635a4b6b1d1d,c488e0503f57945d380095adc5a1a345e
WHERE c488e0503f57945d380095adc5a1a345e.fk =
d358fac2722484bb39df0635a4b6b1d1d.id ORDER BY
d358fac2722484bb39df0635a4b6b1d1.d.row_num
CREATE CHILD INDEX TABLE : SELECT DISTINCT
LPAD(IFNULL(j8fb43757c91f41038b4bac735cabc4f4.id,0),20,' ') INTO
OUTFILE '/data2/reports/instance_2/358fac27-2248-4bb3-9df0-
635a4b6b1d1d/358fac27-2248-4bb3-9df0-635a4b6b1d1d.idx' FIELDS
TERMINATED BY ',' LINES TERMINATED BY '\n' FROM
j8fb43757c91f41038b4bac735cabc4f4 ORDER BY row_num
CREATE FILE INDEX: SELECT j8fb43757c91f41038b4bac735cabc4f4.id,
LPAD(IFNULL(min(t.min),0),9,'0'), LPAD(IFNULL(max(t.max),0),9,'0') INTO
OUTFILE '/data2/reports/instance_2/358fac27-2248-4bb3-9df0-
635a4b6b1d1d/358fac27-2248-4bb3-9df0-635a4b6b1d1d.idx' FIELDS
TERMINATED BY ',' LINES TERMINATED BY '\n' FROM
j8fb43757c91f41038b4bac735cabc4f4 LEFT OUTER JOIN (SELECT fk AS col,
min(row_num) AS min, max(row_num) AS max FROM
c21e79b35542b420ea012d0b042d3334a GROUP BY col) AS t ON
j8fb43757c91f41038b4bac735cabc4f4.id = t.col GROUP BY 1 ORDER BY
j8fb43757c91f41038b4bac735cabc4f4.row_num
```

In one implementation, a WHERE clause may be added to an individual query to reduce the rows to be processed for cost optimization. When the base or driver query is based on product, the subsequent individual queries also have to have a product, so that WHERE clause may be:

"WHERE product_v !=null"

In one implementation, the original query is "product with document" and has a filter on it, for example, to "return only product=CC". During the optimization, the product query may be executed first. Then the following WHERE clause may be added to the document query to limit the interme- In this example, the INSERTs are used to pull the data from Solr into the MySQL tables, and the final SELECT . . . INTO OUTFILE lines are where the index and data files are generated.

At 943, join may be executed between all objects based on foreign key relationships, which are used as the links, to filter down the expected result set. The process of the join is to find the combinations of the objects that meet the requirements of the report type definition, which is "product with document" for Example (3) of the multi-object query language statement. If a document does not use any products, or if a product does not have any documents associated with it, they will not be included in the result of the join.

In one embodiment, hash function may be used to implement the join in the database, which may include inner join and outer join.

At 944, the join results may be exported to a fixed binary representation in the file system, which is basically an index. An example of the resulting index file after the join for Example (2) of the multi-object query language statement is shown in FIG. 13. As shown, data may be broken down into three index files: a first file for primary, a second file for product, and a third file for country. The first file may have Document ID, child row start for product, child row end for product, child row start for country, and child row end for country. The first line may indicate that document ID is 1, starting as 0 and ending as 3. In the second file for product, with row ID 0-5, the first three rows, 0, 1, and 2, are associated with the chunk of data (1, 0, 3) in the first file, and the next two rows may represent (2, 4, 5) in the first file. The read algorithm is: jump to the row of the document, the driver, read the child row start for product, and then read based on byte calculation. The third file for country may be read in a similar manner. The actual file may be much smaller, because it does not get all the data set, but only their IDs.

In one embodiment, the products in the content management system 210 may include CC, VP, VPXR, and WD. FIG. 14 illustrates an exemplary GUI 1400 which displays documents in the content management system. As shown, there are ten documents in the content management system. The GUI 1400 may also display which products are used by which documents. For example, each of documents Test 4, Test 2, and Test 1 uses the product CC, document Number 10 uses products CC and VPXR, and document Test 5 uses the product VP. An inner join logic may be used to show what is the same, e.g., the user cares about the fact that product CC is used by Test 1, Test 2, Test 4 and Number 10. During indexed access execution of Example (3) of the multi-object query language statement, an example of the Resulting Index File after the join and its corresponding data file are shown below. Since the product WD is not used in any documents, it is not returned in the query results and not included in the resulting index file.

| Resulting index File | | |
|---|---|---|
| CC, | 000000001, | 000000004 |
| VP, | 000000005, | 000000005 |
| VPXR, | 000000006, | 000000006 |

| Corresponding Data File |
|---|
| 1 |
| 2 |
| 4 |
| 10 |
| 5 |
| 10 |

The first column in the Resulting Data file is the product key, which is the ID from the product table. The next two columns are starting and ending row in the data file, where those keys are valid. The first row in the Resulting Index File indicates that row 1 to row 4 in the Corresponding Data File are the documents which use the product CC. In the Corresponding Data File, the IDs for these documents are 1, 2, 4, 10. The second row in the Resulting Index File indicates that row 5 to row 5 in the Corresponding Data File is the document which has VP as the product key. In the Corresponding Data File, the ID for the document is 5. The third row in the Resulting Index File indicates that row 6 to row 6 in the Corresponding Data File is the document which uses the product VPXR. In the Corresponding Data File, the ID for the document is 10.

Now return to FIG. 9B. At 945, the resulting index may be returned to the query language execution engine 214 where size based index access can be performed. The results may then be returned to the report execution engine 213. In one implementation, the results from the query language execution engine 214, in JSON, may be:

```
{
  "responseStatus":"SUCCESS",
  "responseDetails":{
    "find":"search term",
    "limit":500,
    "offset":500,
    "size":500,
    "totalFound":2000,
    "previous_page":"/api/v9.0/query/00Q12334586932?limit=500&offset=0",
    "next_page":"/api/v9.0/query/00Q12334586932?limit=500&offset=1000"
  },
  "data": [
    {
      "id":1,
      "document_product_vr":{
        "responseDetails":{
          "limit":250,
          "offset":0,
          "size":250,
          "totalFound":500,
          "next_page":"/api/v9.0/query/00Q448829222?limit=250&offset=250"
        },
        "data":[
          {
            "extrnal_id_v":"EXTI0123"
          }
        ]
      },
      "document_country_vr":{
        "responseDetails":{
          "limit":250,
          "offset":250,
          "size":250,
          "totalFound":1000,
          "previous_page":"/api/v9.0/query/00Q24845839872?limit=250&offset=0",
          "next_page":"api/v9.0/query/00Q24845839872?limit=250&offset=500"
        },
        "data":[
          {
            "name_v":"Austria"
          },
          {
            "name_v":"Costa Rica"
          }
        ]
      }
    }
  ]
}
```

In one implementation, the results from the query language execution engine 214, in XML, may be:

```
<?xml version="1.0" encoding="utf-16"?>
<ResultSetRestResult>
  <responseStatus>SUCCESS</responseStatus>
```

-continued

```
<responseDetails>
    <find>search term</find>
    <limit>500</limit>
    <offset>500</offset>
    <size>500</size>
    <totalFound>2000</totalFound>
    <previous_page>/api/v9.0/query/00Q12334586932?limit=
500&offset=0</previous_page>
        <next_page>/api/v9.0/query/00Q12334586932?limit=
500&offset=1000</next_page>
    </responseDetails>
    <data>
        <id>1</id>
        <document_product_vr>
            <responseDetails>
                <limit>250</limit>
                <offset>0</offset>
                <size>250</size>
                <totalFound>500</totalFound>
                <next_page>/api/v9.0/query/00Q448829222?limit=
250&offset=250</next_page>
            </responseDetails>
            <data>
                <external_id_v>EXTID123</external_id_v>
            </data>
        </document_product_vr>
        <document_country_vr>
            <responseDetails>
                <limit>250</limit>
                <offset>250</offset>
                <size>250</size>
                <totalFound>1000</totalFound>
                <previous_page>/api/v9.0/query/00Q24845839872?
limit=250&offset=0</previous_page>
                <next_page>/api/v9.0/query/00Q24845839872?limit=
250&offset=500</next_page>
            </responseDetails>
            <data>
                <name_v>Austria</name_v>
            </data>
            <data>
                <name_v>Costa Rica</name_v>
            </data>
        </document_country_vr>
    </data>
</ResultSetRestResult>
```

With these IDs, the query language execution engine 214 may determine that the real pieces required are on the object external ID, and pull just the pieces of data it needs based on these IDs. By joining purely on the IDs, instead of the data, and putting data in proper orders to support "order by" or instructions of that nature with the indexed access execution engine 216, and then access and provide the data with the query language execution engine 214, the content management server 212 may significantly speed up the query processing, and provide the end result set in real time.

At 916, the results from the query language execution engine 214 may go through a posting process at the post processing unit 2139 in the report execution engine 213, and be put in the presentation layer, so that it may be formatted and presented in a more user friendly report.

Figure 15:
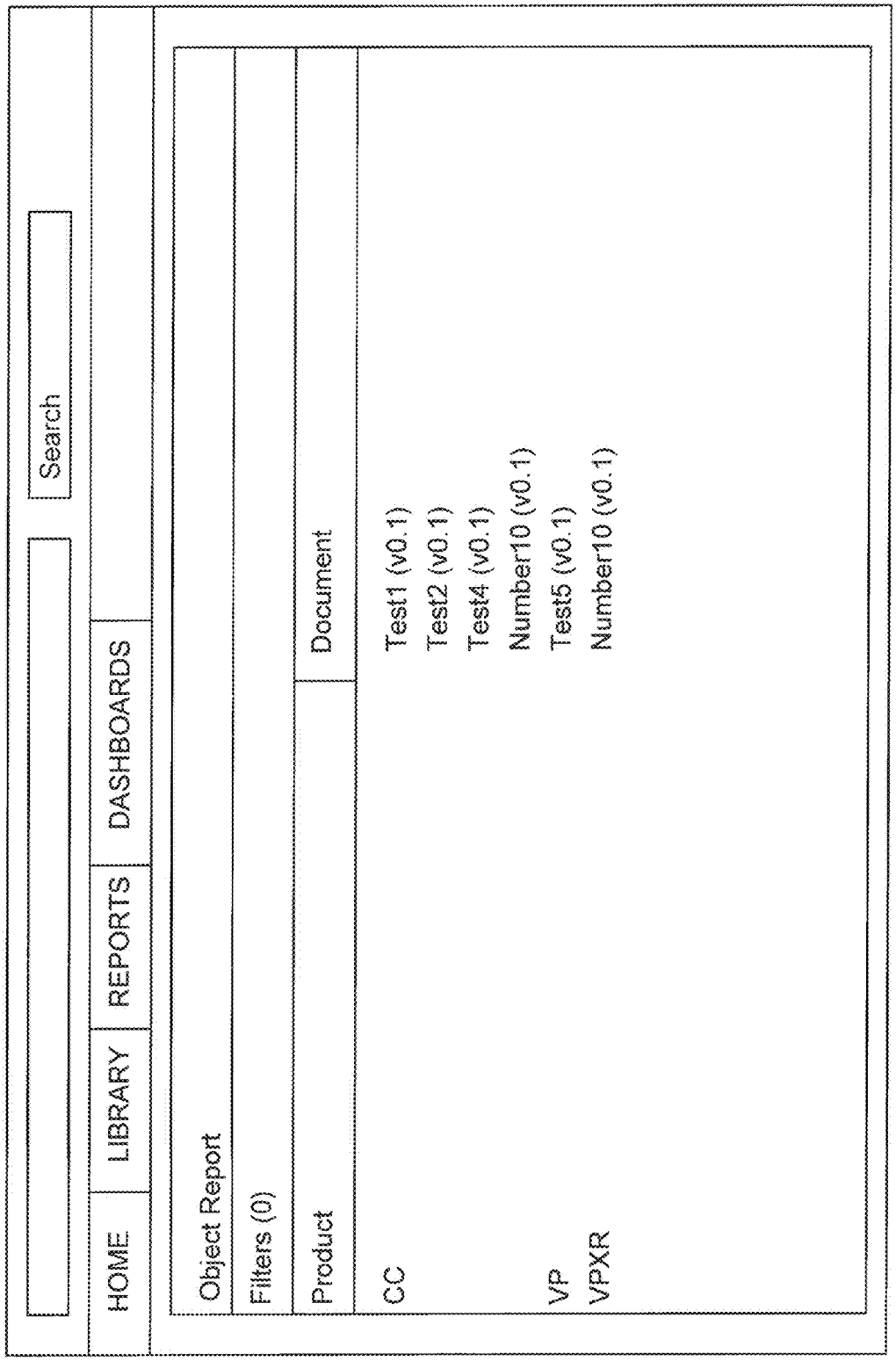
FIG. 15 illustrates a GUI which displays an example of the multi-object report generated according to one embodiment of the present invention.

FIG. 15 illustrates a GUI 1500 which displays an example of the report generated at 916 for Example (3) of the multi-object query language statement. As indicated on the GUI 1500, six rows are returned, which includes four documents for product CC (i.e., Test 1, Test 2, Test 4 and Number 10); one document for product VP (i.e., Test 5), and one document for product VPXR (i.e., Number 10). Since the product WD is not used in any documents, it is not returned in the query results. The inner join effectively removed it from the result set. If the filter 1103 is set to CC, only the CC row with three documents will be displayed.

The results may be sorted by running standard database queries on it. The report execution engine 213 may take them, put them into its own database, and then act upon it.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for reporting multiple objects in a content management system, the method comprising:
   storing a plurality of objects in a storage device;
   receiving a report type definition which defines a first object and a second object and a relationship between the first and second objects;
   generating a multi-object query language statement for the report type definition;
   dissecting the multi-object query language statement into a first query and a second query, wherein the first query corresponds to the first object, and the second query corresponds to the second object;
   generating an indexed access query definition for the first and second queries; and
   extracting ID of the first object corresponding to the first query in the indexed access query definition and ID of the second object corresponding to the second query in the indexed access query definition.

2. The method of claim 1, further comprising: joining the extracted ID of the first object and the extracted ID of the second object, and generating an index for a join result.

3. The method of claim 2, wherein the index is a fixed binary representation.

4. The method of claim 3, further comprising: generating a corresponding data file for the index.

5. The method of claim 2, further comprising: performing index access for objects at a Lucene based search engine according to the index.

6. The method of claim 5, further comprising: executing Solr query and returning a response.

7. The method of claim 5, wherein the index access is sized based.

8. The method of claim 1, further comprising: post processing response of the index access to generate a report for displaying, wherein the report comprises the first object and the second object.

9. The method of claim 8, further comprising: enabling grouping data in the report with the first object.

10. The method of claim 8, further comprising: enabling aggregating the data in the report.

11. The method of claim 1, further comprising: persisting the extracted ID of the first object and the extracted ID of the second object to MySQL.

12. The method of claim 1, wherein the indexed access method is virtual storage access method ("VSAM").

13. The method of claim 1, wherein the dissecting is through ANTLR based parsing.

14. The method of claim 1, wherein hash function is used to implement the join.

15. The method of claim 14, wherein the join comprises an inner join and an outer join.

16. The method of claim 1, wherein the join is based on a foreign key relationship between the first object and the second object.

17. The method of claim 1, further comprising: calculating cost of the first object and the second object involved in the indexed access query definition.

18. The method of claim 17, further comprising: determining that the indexed access query definition requires further filtering of the first object.

19. The method of claim 17, further comprising: rewriting the first query to limit its result size.

20. A content management system, comprising:
   a storage device for storing a plurality of objects;
   a report execution engine for receiving a report type definition which defines a first object and a second object and a relationship between the first and second objects, and generating a multi-object query language statement for the report type definition;
   a query language execution engine for dissecting the multi-object query language statement into a first query and a second query corresponding to the first object and the second object respectively, generating an indexed access query definition for the first and second queries, and performing index access for objects at a Lucene based search engine according to an index; and
   an indexed access execution engine for extracting ID of the first object corresponding to the first query in the indexed access query definition and ID of the second object corresponding to the second query in the indexed access query definition.

* * * * *